(12) United States Patent
Futami et al.

(10) Patent No.: US 7,877,017 B2
(45) Date of Patent: Jan. 25, 2011

(54) OPTICAL WAVEFORM MEASUREMENT SYSTEM AND OPTICAL WAVEFORM MEASUREMENT METHOD

(75) Inventors: Fumio Futami, Kawasaki (JP); Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 547 days.

(21) Appl. No.: 12/071,514

(22) Filed: Feb. 21, 2008

(65) Prior Publication Data
US 2009/0010656 A1    Jan. 8, 2009

(30) Foreign Application Priority Data
Mar. 19, 2007    (JP)    ............... 2007-071678

(51) Int. Cl.
*H04B 10/00*    (2006.01)
(52) U.S. Cl. .................. 398/158; 398/159; 398/162
(58) Field of Classification Search .................. 398/158, 398/159, 162, 163, 9, 25, 26, 33
See application file for complete search history.

(56) References Cited

U.S. PATENT DOCUMENTS

| | | | |
|---|---|---|---|
| 2003/0058512 A1* | 3/2003 | Jacobowitz et al. | ......... 359/193 |
| 2003/0118349 A1 | 6/2003 | Ohara et al. | |
| 2004/0005153 A1* | 1/2004 | Watanabe | ................. 398/148 |
| 2006/0051100 A1 | 3/2006 | Watanabe | |
| 2006/0093375 A1* | 5/2006 | Futami et al. | ............... 398/155 |

FOREIGN PATENT DOCUMENTS

| | | |
|---|---|---|
| EP | 1 318 627 A2 | 6/2003 |
| EP | 1 633 066 A2 | 3/2006 |
| JP | 2003-15097 | 1/2003 |

OTHER PUBLICATIONS

Yamamoto T et al., "Clock recovery for 160 GBit/s data signals using phase-locked loop with interferometric optical switch based on semiconductor optical amplifier", Electronics Letters, Apr. 12, 2001 vol. 37, No. 8, pp. 509-510.
European Search Report issued Apr. 6, 2009 in corresponding European Patent Application 08002885.5.

(Continued)

*Primary Examiner*—M. R. Sedighian
(74) *Attorney, Agent, or Firm*—Staas & Halsey LLP (57) ABSTRACT

In an optical waveform measurement system, a phase comparator compares phases between an electric signal output from a PD and an electric signal output from a mixer, and outputs a signal having an amplitude proportional to the phase difference of the two electric signals to a VCO via an LPF, as an error signal. A BPF removes a jitter from the electric signal output from the VCO, and a sampling pulse light source outputs sampling light based on the electric signal with the jitter removed. An optical sampling gate samples signal light to be measured with sampling light output from a sampling pulse light source, and the sampled signal light to be measured is measured by an oscilloscope.

8 Claims, 5 Drawing Sheets

OTHER PUBLICATIONS

Osamu Kamatani, et al., "Ultrahigh-Speed Clock Recovery with Phase Lock Loop Based on Four-Wave Mixing in a Traveling-Wave Laser Diode Amplifier", *Journal of Lightwave Technology*, vol. 14, No. 8, Aug. 1996, pp. 1757-1767.

C. Boerner, et al., "160 Gbit/s clock recovery with electro-optical PLL using bidirectionally operated electroabsorption modulator as phase comparator", *Electronics Letters*, vol. 39, No. 14, Jul. 10, 2003, pp. 1071-1073.

Koji Igarashi, et al., "High-sensitive optoelectronic clock recovery circuit featuring GVD-independent operation", *ECOC 2006 Proceedings*, vol. 6, Paper Th4.4.2, pp. 43-44.

A. Otani, et al., "Advanced envelope detection method with novel optical PLL for optical sampling trigger", *Electronics Letters*, vol. 41, No. 18, Sep. 1, 2005.

* cited by examiner

OPTICAL WAVEFORM MEASUREMENT SYSTEM AND OPTICAL WAVEFORM MEASUREMENT METHOD

BACKGROUND OF THE INVENTION

1. Field of the Invention

The present invention relates to an optical waveform measurement system and an optical waveform measurement method that measure a waveform of signal light.

2. Description of the Related Art

Optical fiber communication systems operating at a bit rate of 40 Gb/s per channel have been increasingly developed in recent years. The next targets include research on systems operating at a bit rate of 160 Gb/s, and systems operating at a bit rate of 100 Gb/s as the next generation Ethernet (trademark) of 10-Gigabit Ethernet. In this process of research and development, a technology that stably and faithfully observes ultrahigh-speed signal light is required.

Figure 4:
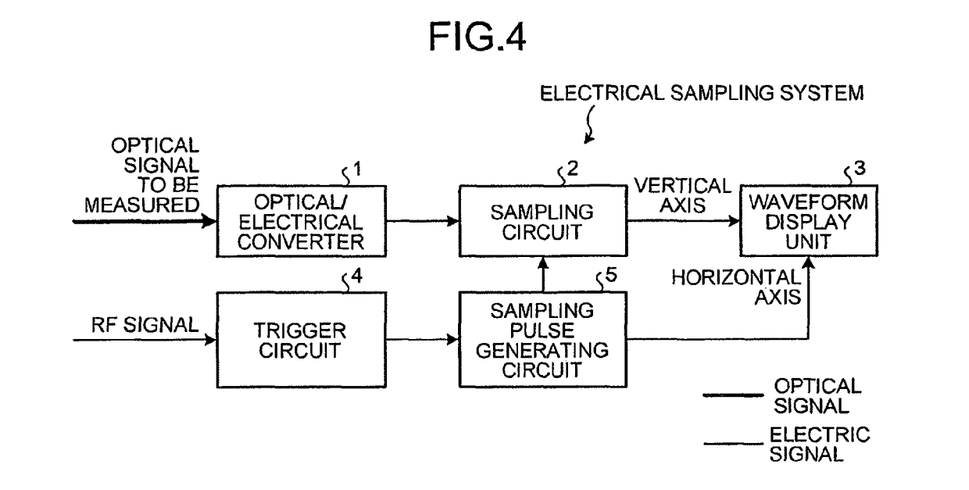
FIG. 4 is an example diagram of a configuration of an electrical sampling system of related art.

FIG. 4 is an example diagram of a configuration of an electrical sampling system of related art. As shown in FIG. 4, the electrical sampling system includes an optical/electrical converter 1, a sampling circuit 2, a waveform display unit 3, a trigger circuit 4, and a sampling pulse generating circuit 5.

After an optical signal is converted into an electric signal by the optical/electrical converter (photo diode: PD) 1, the signal is sampled at the sampling circuit 2 formed by an electronic circuit, and a waveform of the sampled signal is observed by the waveform display unit 3. The trigger circuit 4 outputs a trigger signal to the sampling pulse generating circuit 5, based on a radio frequency (RF) signal synchronized with an optical signal to be measured. The sampling pulse generating circuit 5 generates a sampling pulse at the timing of the trigger signal input from the trigger circuit 4, and outputs the generated sampling pulse to the sampling circuit 2 and the waveform display unit 3.

When a waveform of a signal is observed by the waveform display unit 3, the RF signal synchronized with the optical signal to be measured is required. For example, when signal light of 100 Gb/s is measured, even a band up to the second harmonic component of the signal light is required, due to the limitation of operation speed of electronic circuits, the sampling circuit 2 becomes inoperative.

Figure 5:
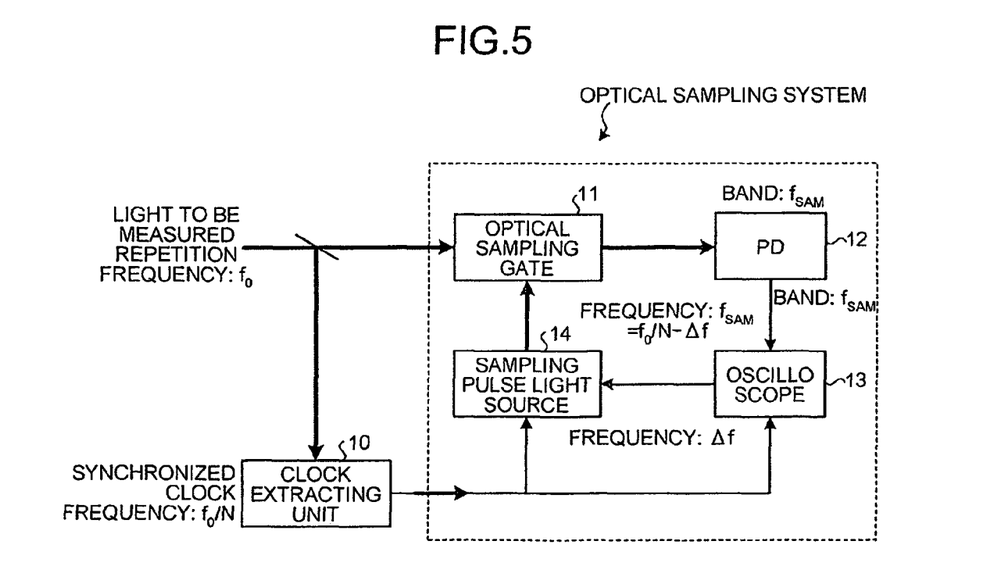
FIG. 5 is an example diagram of a configuration of an optical sampling system of related art.

In related art, there has developed an optical sampling method that breaks a time resolution limit caused by a band limit of an electronic circuit, and realizes an ultrahigh time resolution. FIG. 5 is an example diagram of a configuration of an optical sampling system of the related art. As shown in FIG. 5, the optical sampling system includes a clock extracting unit 10, an optical sampling gate 11, a photo diode (PD) 12, an oscilloscope 13, and a sampling pulse light source 14.

The clock extracting unit 10 extracts a clock signal synchronized with light to be measured, and outputs the extracted clock signal to the sampling pulse light source 14 and the oscilloscope 13. The sampling pulse light source 14 generates sampling pulse light based on the clock signal input from the clock extracting unit 10, and outputs the generated sampling pulse light to the optical sampling gate 11.

The signal light to be measured and the sampling pulse light with a short pulse width are incident on the optical sampling gate 11. The transmittance of the optical sampling gate 11 is controlled by the sampling pulse light. Accordingly, a repetition frequency of light output from the optical sampling gate 11 has the same frequency as an optical sampling pulse. The oscilloscope 13 displays the waveform of the light to be measured, based on the sampling signal converted into the electric signal by the PD 12, and the clock signal input from the clock extracting unit 10.

Therefore, when the sampling light whose repetition frequency is smaller than the frequency of the band limit of the electronic circuit with an ultrashort pulse is prepared, by combining with the optical sampling gate that responds at ultrahigh speed, the sampling of the ultrahigh time resolution can be realized. Accordingly, the light to be measured can be observed by the oscilloscope 13.

For example, an optical sampling of the time resolution of approximately picoseconds is realized, by preparing an optical pulse of a pulse width of picoseconds as an optical sampling pulse, and an optical fiber switch as an optical sampling gate. However, as shown in FIG. 5, the sampling pulse light source should be synchronized with the light to be measured.

Therefore, in general, as shown in FIG. 5, a clock signal synchronized with the light to be measured needs to be extracted, using the clock extracting unit 10. An ultrahigh-speed clock extracting method that extracts a clock signal from a high-speed optical signal at a rate of equal to or more than 100 Gb/s has been proposed.

An apparatus described in O. Kamatani, S. Kawanishi, "Ultrahigh-speed clock recovery with phase lock loop based on four-wave mixing in a traveling-wave laser diode amplifier," Lightwave Technology, Journal of, Volume: 14 Issue: 8, Aug. 1996, Page(s): 1757-1767 uses an optical phase comparator that includes a semiconductor optical amplifier and a short-pulse light source. Although this apparatus can be advantageously applied for an ultrahigh-speed signal, the size of the apparatus naturally increases. A method shown in C. Boerner, C. Schubert, C. Schmidt, E. Hilliger, V. Marembert, J. Berger, S. Ferber, E. Dietrich, R. Ludwig, B. Schmauss, H. G. Weber, "160 Gbit/s clock recovery with electro-optical PLL using bidirectionally operated electroabsorption modulator as phase comparator," Electronics Letters, Volume: 39, Issue: 14, 10 Jul. 2003, Pages: 1071-1073 is a method that realizes an ultrahigh-speed optical phase comparator, by controlling an electro-absorption modulator (EAM) by an ultrahigh-speed RF signal of approximately 40 gigahertz, for example. Comparing with the method of "Ultrahigh-speed clock recovery with phase lock loop based on four-wave mixing in a traveling-wave laser diode amplifier", the size of the apparatus increases because the short-pulse light source is not required. However, because the ultrahigh-speed RF circuit is required in the "160 Gbit/s clock recovery with electro-optical PLL using bidirectionally operated electroabsorption modulator as phase comparator", the size of the apparatus still remains large.

In a system disclosed in K. Igarashi, K. Katoh, and K. Kikuchi, "High-sensitive optoelectronic clock recovery circuit featuring GVD-independent operation," ECOC2006, PDP Th4.4.2, Cannes, France, September 2006, an ultrahigh-speed optical phase comparator is formed by generating a frequency chirp using a phase modulation, and taking the chirp component by a light transmissive filter. However, the center wavelength of the light transmissive filter needs to be adjusted, depending on the wavelength of the signal light and the bit rate. Accordingly, an adaptation to the optical sampling that observes ultrahigh-speed signal light of any suitable wavelength is difficult.

To extract a clock signal from the ultrahigh-speed signal light, only an optical phase comparator of ultrahigh speed is required. As the optical sampling system shown in FIG. 5, in the method that separates a part of signal light, and extracts a clock signal from the signal light, the ultrahigh-speed phase comparator is required only to extract the clock signal. Accordingly, the optical sampling system itself becomes very large.

Figure 6:
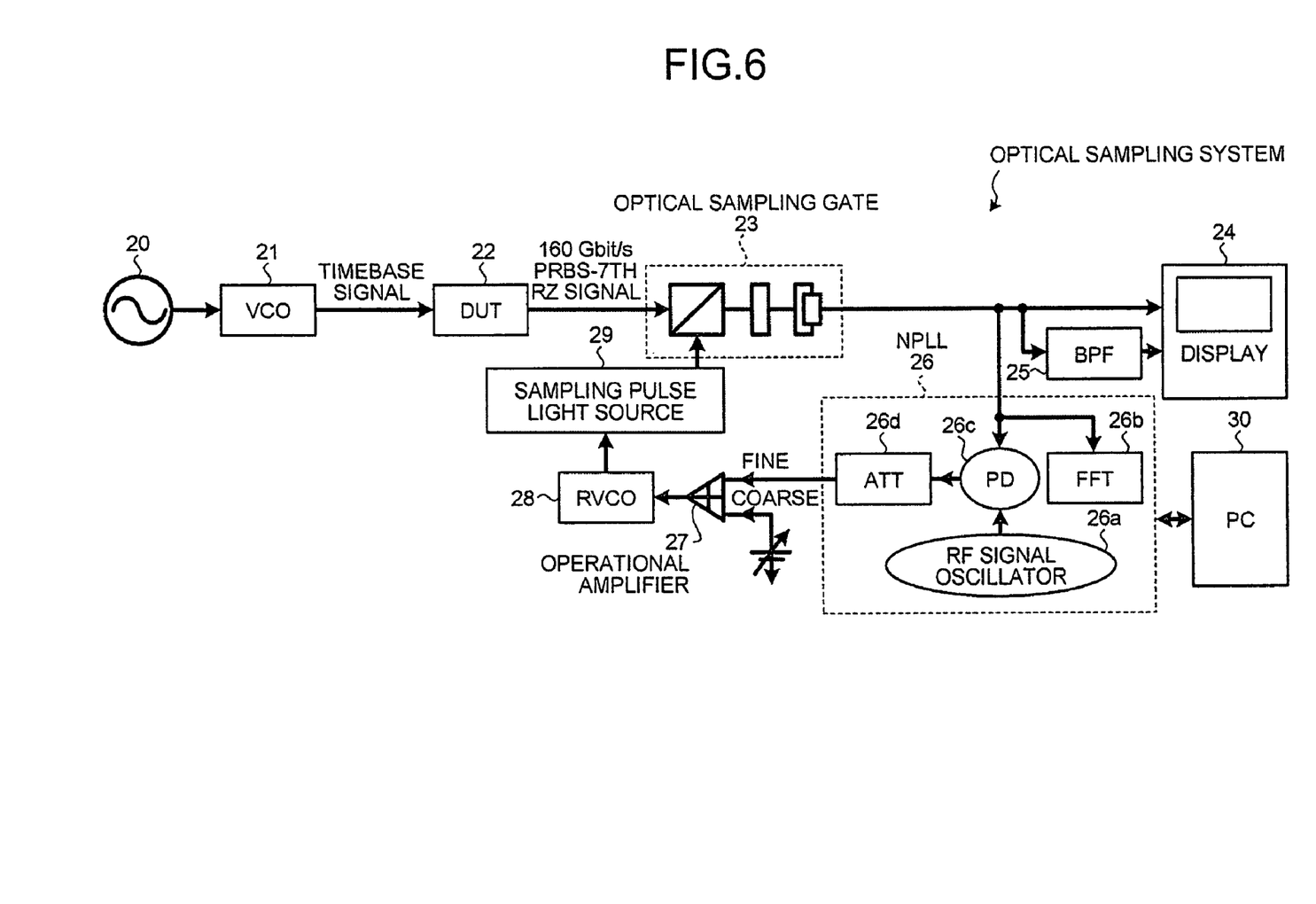
FIG. 6 is an example diagram of an optical sampling system according to "Advanced envelope detection method with novel optical PLL for optical sampling trigger".

To solve this problem, a system in which an optical sampling gate itself is an ultrahigh-speed optical gate, and uses this gate for an optical phase comparator is disclosed in A. Otani, Y. Tsuda, F. Hirabayashi, and K. Igawa, "Advanced envelope detection method with novel optical PLL for optical sampling trigger," Electronics Letters, Vol. 41, No. 18, 2005, Pages: 1019-1021. FIG. 6 is an example diagram of an optical sampling system according to the "Advanced envelope detection method with novel optical PLL for optical sampling trigger". As shown in FIG. 6, the optical sampling system includes an oscillator 20, a voltage controlled oscillator (VCO) 21, a device under test (DUT) 22, an optical sampling gate 23, a display 24, a band bass filter (BPF) 25, a novel optical phase locked loop (NPLL) 26, an operational amplifier 27, a reference voltage controlled oscillator (RVCO) 28, a sampling pulse light source 29, and a PC 30. The NPLL 26 includes an RF signal oscillator (local signal generator) 26a, an FFT unit 26b, a phase comparator (PD) 26c, and an ATT 26d.

As shown in FIG. 6, for example, signal light of $f_0=160$ Gb/s output from the DUT 22 and sampling pulse light output from the sampling pulse light source 29 are combined, and are incident on the optical sampling gate 23 made of a nonlinear crystal. As is clear in FIG. 6, the optical sampling system does not require an optical clock extracting unit synchronized with the signal light.

The RF signal oscillator 26a is an oscillator that is set within the optical sampling system, and the RF signal (frequency of $\Delta f=f_0-Nf_s$; N is a positive number) output from the RF signal oscillator 26a, and the signal light (frequency of $f_s$, envelope cycle of $\Delta f$) output from the optical sampling gate 23 are input into the PD 26c.

In the PD 26c, phases between the envelope (cycle of $\Delta f$) of the signal light output from the optical sampling gate 23 and the RF signal output from the RF signal oscillator 26a are compared, and a signal that has an amplitude proportional to the phase difference is output as an error (error signal). The RVCO 28 obtains the error signal via the operational amplifier 27, and outputs the RF signal based on the obtained error signal to the sampling pulse light source 29, and drives the sampling pulse light source 29.

When the sampling pulse light source 29 outputs pulse light to the optical sampling gate 23, a phase locked loop (PLL) is formed. The optical sampling system sweeps the signal light output from the optical sampling gate 23 by the RF signal taken out from the signal light via the BPF 25, and displays the signal light on the display 24.

With this series of procedures, waveforms can be observed by the optical sampling, without preparing an optical gate specified for the clock extraction, and extracting a clock signal directly from the light to be measured (without enlarging the apparatus).

However, in the above-described related art, waveforms of light to be measured cannot be measured accurately.

In other words, in the technology disclosed in "Advanced envelope detection method with novel optical PLL for optical sampling trigger", the efficiency of the optical sampling gate 23 is low. Therefore, when a signal waveform with a poor optical signal-to-noise ratio (OSNR) is to be observed, the power of the signal light output from the optical sampling gate 23 becomes low. Accordingly, the sampling light cannot be generated stably, and a faithful waveform cannot be observed.

When the signal light with a large jitter is to be observed, the jitter is also included in the envelope of the signal light output from the optical sampling gate. Accordingly, a jitter component is included in the RF signal that drives the sampling light.

SUMMARY OF THE INVENTION

It is an object of the present invention to at least partially solve the problems in the conventional technology.

According to an aspect of the present invention, an optical waveform measurement system that measures a waveform of signal light includes a signal light generating unit that changes, when the signal light and sampling light are incident on the signal light generating unit, transmittance depending on the sampling light and generates output signal light prepared by matching a frequency of the signal light and a frequency of the sampling light; a jitter removing unit that converts the output signal light into an electric signal having a frequency less than a predetermined frequency and removes a jitter included in the electric signal; a sampling light adjusting unit that adjusts the sampling light incident on the signal light generating unit, based on the electric signal with the jitter removed by the jitter removing unit; and an optical waveform measuring unit that measures the waveform of the signal light, based on the output signal light generated from the sampling light adjusted by the sampling light adjusting unit and being incident on the signal light generating unit.

According to another aspect of the present invention, an optical waveform measurement method for measuring a waveform of signal light includes generating output signal light by changing transmittance depending on sampling light input to an optical gate, so that a frequency of the signal light input to an optical gate and a frequency of the sampling light are matched; converting the output signal light into an electric signal having a frequency less than a predetermined frequency; removing a jitter included in the electric signal; adjusting the sampling light based on the electric signal with the jitter removed; and measuring the waveform of the signal light, based on the output signal light generated from the adjusted sampling light input to the optical fate.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an optical waveform measurement system and an optical waveform measurement method according to the present invention will now be explained in detail below with reference to the accompanying drawings.

Embodiments of an optical waveform measurement system and an optical waveform measurement method according to the present invention will now be explained in detail below, based on the accompanying drawings. However, the present invention is not limited to these embodiments.

An optical waveform measurement system according to a first embodiment of the present invention will be described first. In the optical waveform measurement system according to the first embodiment, when a waveform of signal light that is a measurement object (hereinafter, "signal light to be measured") is measured by an oscilloscope or the like, a radio frequency (RF) signal (trigger signal) is generated by a phase locked loop (PLL) circuit and a low-frequency voltage controlled oscillator (VCO), without extracting the RF signal directly from the signal light to be measured. In the optical waveform measurement system according to the first embodiment, the RF signal with jitter removed is input into a sampling pulse light source, and an optical sampling gate samples the signal light to be measured, based on sampling light output from the sampling pulse light source.

In this manner, the optical waveform measurement system according to the first embodiment samples the signal light to be measured, by removing the jitter included in the RF signal, thereby enabling to measure the waveform of the signal light to be measured correctly.

The optical waveform measurement system according to the first embodiment uses an optical fiber switch that includes an optical fiber and a polarizer as an optical sampling gate. Accordingly, the switching efficiency can be improved, and even a phase of low-power signal light to be measured can be stably compared, thereby enabling to stably generate an RF signal.

Figure 1:
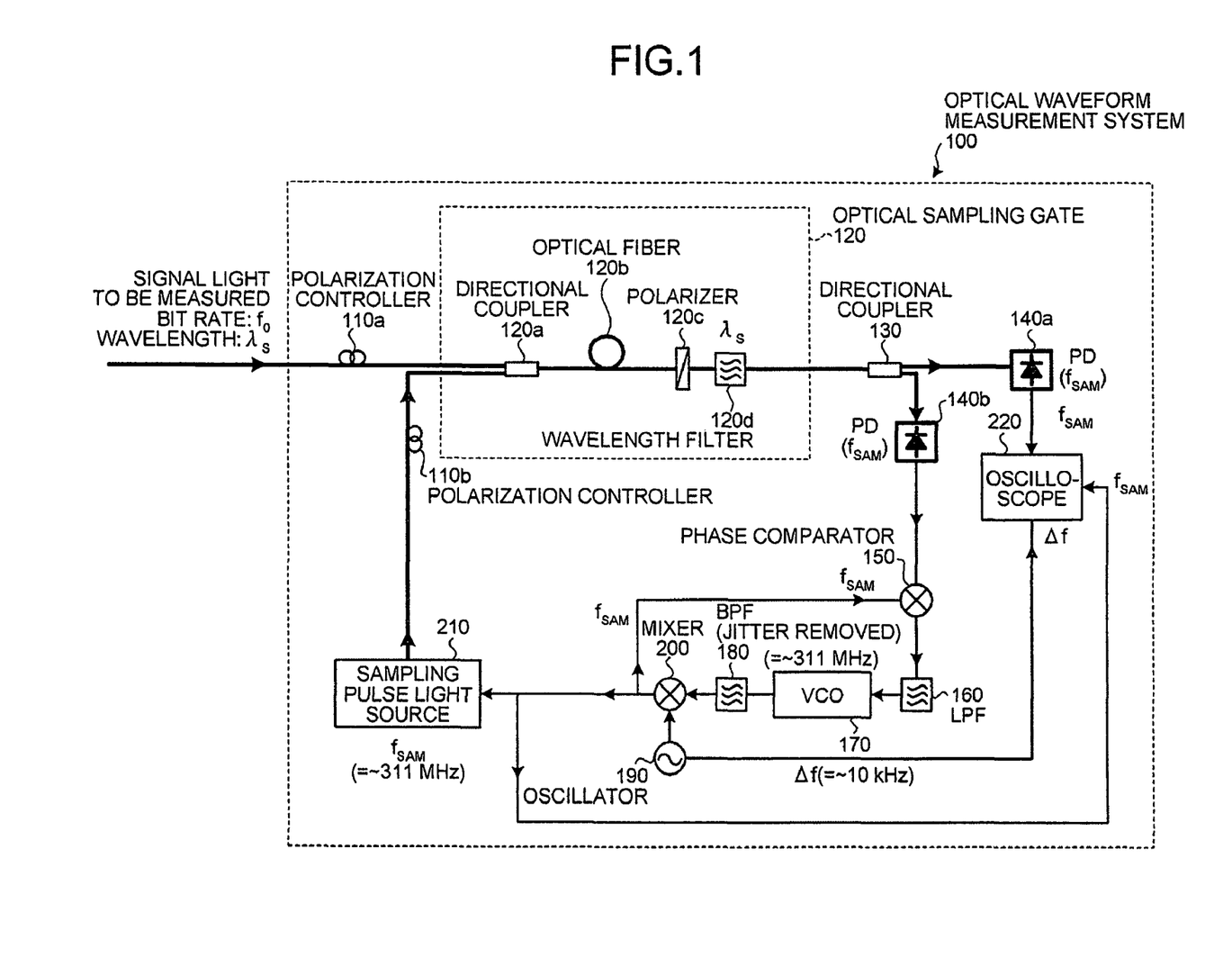
FIG. 1 is a configuration block diagram of an optical waveform measurement system according to a first embodiment of the present invention.

A configuration of the optical waveform measurement system according to the first embodiment will now be explained. FIG. 1 is a configuration block diagram of the optical waveform measurement system according to the first embodiment of the present invention. As shown in FIG. 1, an optical waveform measurement system 100 includes polarization controllers 110a and 110b, an optical sampling gate 120, a directional coupler 130, photo diodes (PDs) 140a and 140b, a phase comparator (or mixer) 150, a low pass filter (LPF) 160, a VCO 170, a band pass filter (BPF) 180, an oscillator 190, a mixer 200, a sampling pulse light source 210, and an oscilloscope 220.

Among these, the polarization controllers 110a and 110b are units that adjust polarization of signal light to be transmitted. The polarization of the signal light to be measured incident from outside is adjusted by the polarization controller 110a. The polarization of the sampling light output from the sampling pulse light source 210 is adjusted by the polarization controller 110b. The frequency of the signal light to be measured is set to $f_O$, and the frequency of the sampling light is set to $f_{SAM}$.

The optical sampling gate 120 is a unit (optical fiber switch) that samples the signal light to be measured with the sampling light output from the sampling pulse light source 210 and outputs the sampled signal light to be measured. As shown in FIG. 1, the optical sampling gate 120 includes a directional coupler 120a, an optical fiber 120b, a polarizer 120c, and a wavelength filter 120d.

The directional coupler 120a is a unit that combines the incident signal light to be measured and the sampling light, and outputs the combined signal light to the optical fiber 120b. The optical fiber 120b is a cable that transmits the signal light output from the directional coupler 120a.

The polarizer 120c is a unit that changes transmittance by the ON/OFF of the sampling light included in the signal light that transmits through the optical fiber 120b. The polarizer 120c also extracts out the signal light to be measured, so as to have a frequency of $f_{SAM}$, which is equal to the frequency of the sampling light. The polarizer 120c blocks the signal light (including signal light to be measured) at the timing when the sampling light is turned OFF, and transmits the signal light (including signal light to be measured) at the timing when the sampling light is turned ON.

The wavelength filter 120d is a unit (filter) that extracts the signal light to be measured (frequency of $f_{SAM}$) from the signal light output from the polarizer 120c, and blocks the sampling light included in the signal light.

The directional coupler 130 is a unit that, when the signal light to be measured is incident from the optical sampling gate 120, divides the incident signal light to be measured, and outputs the divided signal light to be measured to the PD 140a and PD 140b, respectively.

The PDs 140a and 140b are units that convert an optical signal into an electric signal. The PD 140a converts the signal light to be measured to the electric signal, and outputs the converted electric signal to the oscilloscope 220. The PD 140b converts the signal light to be measured to the electric signal, and outputs the converted electric signal to the phase comparator 150.

The phase comparator 150 is a unit that compares a phases between the electric signal (frequency of $f_{SAM}$) output from the PD 140b, and the electric signal (frequency of $f_{SAM}$) output from the mixer 200, and outputs the signal that has an amplitude proportional to the phase difference of the respective electric signals to the LPF 160, as an error signal.

The LPF 160 is a unit (filter) that blocks a high-frequency component of the error signal input from the phase comparator 150. The LPF 160 outputs the error signal with the high-frequency component removed to the VCO 170.

The VCO 170 is a unit that operates based on the error signal output from the LPF 160, generates an RF signal (trigger signal) of approximately 311 megahertz, for example, as a frequency that is frequency divided by N, and outputs the generated RF signal to the BPF 180. The BPF 180 is a unit that removes the jitter included in the RF signal, by removing the signal component in a predetermined frequency range of the RF signal output from the VCO 170. The BPF 180 outputs the RF signal with jitter removed to the mixer 200. Because the frequency of the RF signal output from the VCO 170 is approximately 311 megahertz, the BPF 180 can appropriately remove the jitter.

The oscillator 190 is a unit that, for example, generates a reference signal of approximately 10 kilohertz (frequency of $\Delta f$), and outputs the generated reference signal to the mixer 200 and the oscilloscope 220.

The mixer 200 is a unit that combines the RF signal (RF signal with jitter removed) output from the BPF 180 and the reference signal output from the oscillator 190, and outputs the combined electric signal (frequency of $f_{SAM}$) to the phase comparator 150, the sampling pulse light source 210, and the oscilloscope 220.

The sampling pulse light source 210 is a unit that generates sampling light with a frequency of $f_{SAM}$ based on the electric signal with a frequency of $f_{SAM}$ output from the mixer 200, and outputs the generated sampling light to the optical sampling gate 120, via the polarization controller 110b. The sampling pulse light source 210 generates the sampling light based on the electric signal with jitter removed, thereby enabling to generate stable sampling light.

The oscilloscope 220 is a display unit that receives the electric signal (frequency of $f_{SAM}$) of the signal light to be measured output from the PDs 140a and 140b, and the reference signal (frequency of $\Delta f$) output from the oscillator 190, and displays the waveform of the signal light to be measured.

The oscilloscope 220 displays a waveform by sampling the electric signal output from the PD 140a, using the reference signal output from the mixer 220 as a trigger signal. The oscilloscope 220 also displays an eye pattern of the signal light to be measured, based on the electric signal output from the oscillator 190.

As described above, in the optical waveform measurement system 100 according to the first embodiment, the phase comparator 150 compares phases between the electric signal output from the PD 140b and the electric signal output from the mixer 200, and outputs the signal that has an amplitude proportional to the phase difference of the respective electric signals to the VCO 170 via the LPF 160, as an error signal. The BPF 180 removes the jitter of the electric signal output from the VCO 170, and the sampling pulse light source 210 outputs the sampling light, based on the electric signal with jitter removed. Accordingly, the optical sampling gate 120 can sample the signal light to be measured by the stable sampling light, and the oscilloscope 220 can measure the waveform of the signal light to be measured correctly.

In the optical waveform measurement system 100 according to the first embodiment, the optical fiber switch that includes the optical fiber 120b and the polarizer 120c is used as an optical sampling gate. Accordingly, the switching efficiency can be improved, and even a phase of low-power signal light to be measured can be stably compared, thereby enabling the VCO 170 to stably generate an RF signal. Moreover, the sampling pulse light source 210 can stably output the sampling light to the optical sampling gate 120.

The optical waveform measurement system 100 according to the first embodiment samples the electric signal output from the PD 140a, by inputting the electric signal (trigger signal) output from the mixer 200 into the oscilloscope 220. Accordingly, the optical sampling can be performed more stably.

An optical waveform measurement system according to a second embodiment of the present invention will now be explained. The optical waveform measurement system according to the second embodiment, as well as the first embodiment, when the waveform of the signal light to be measured is measured by the oscilloscope or the like, generates the RF signal (trigger signal) from the phase locked loop (PLL) circuit and the low-frequency VCO, without extracting the RF signal directly from the signal light to be measured. The optical waveform measurement system according to the second embodiment also inputs the RF signal with jitter removed into the sampling pulse light source and samples the signal light to be measured, based on the sampling light output from the sampling pulse light source.

In the optical waveform measurement system according to the second embodiment, the optical fiber switch that includes the optical fiber and the polarizer is used as an optical sampling gate. Accordingly, the switching efficiency can be improved, and even a phase of low-power signal light to be measured can be stably compared, thereby enabling to stably generate an RF signal.

In the optical waveform measurement system according to the second embodiment, the sampling light output from the sampling pulse light source is modulated by a modulator (MOD), and the modulated sampling light is output to the optical sampling gate.

Figure 2:
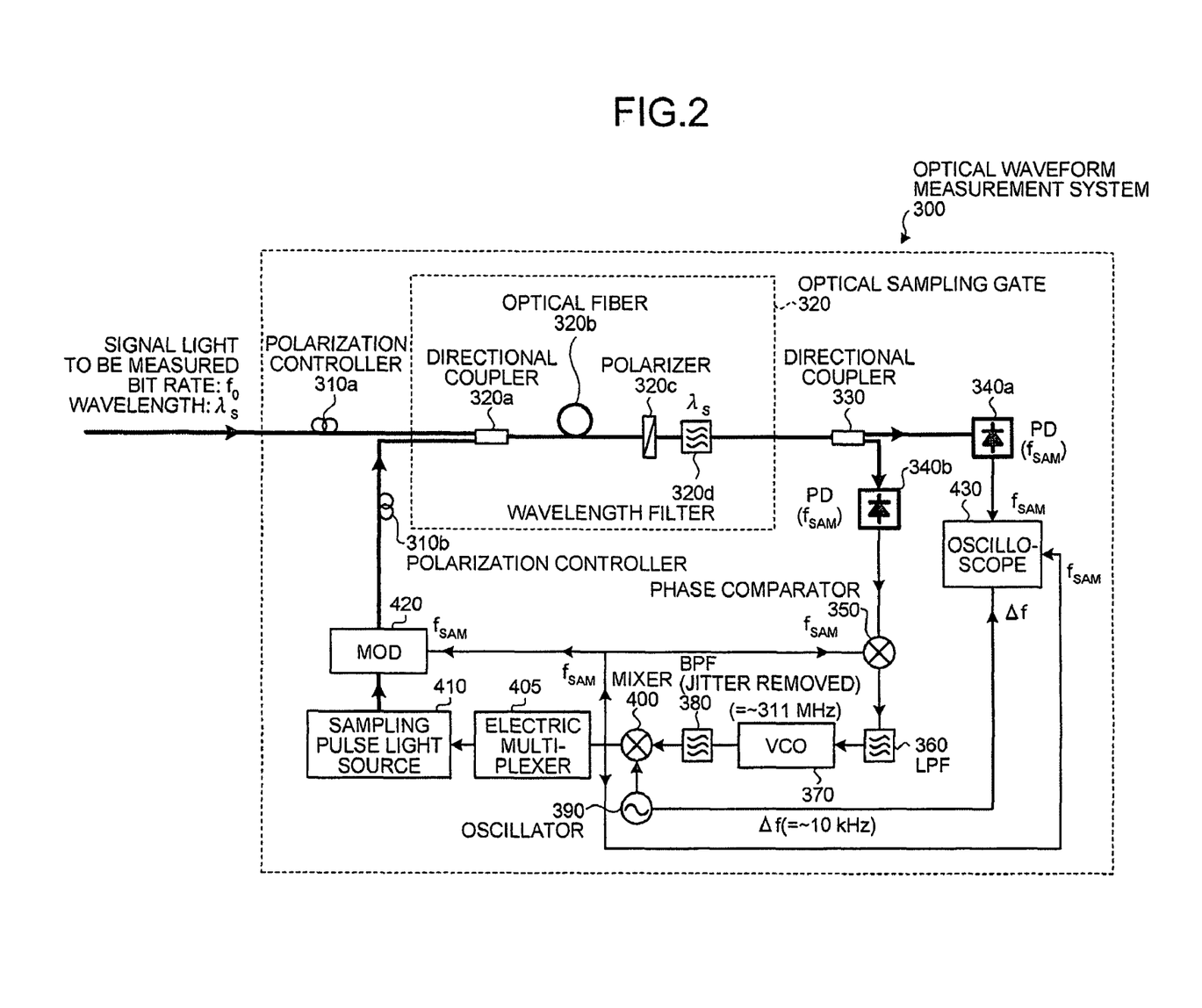
FIG. 2 is a configuration block diagram of an optical waveform measurement system according to a second embodiment of the present invention.

A configuration of the optical waveform measurement system according to the second embodiment will now be explained. FIG. 2 is a configuration block diagram of the optical waveform measurement system according to the second embodiment of the present invention. As shown in FIG. 2, an optical waveform measurement system 300 includes polarization controllers 310a and 310b, an optical sampling gate 320, a directional coupler 330, photo diodes (PDs) 340a and 340b, a phase comparator 350, an LPF 360, a VCO 370, a BPF 380, an oscillator 390, a mixer 400, an electric multiplexer 405, a sampling pulse light source 410, an MOD 420, and an oscilloscope 430.

Among these, the polarization controllers 310a and 310b are units that adjust polarization of signal light to be transmitted. The polarization of the signal light to be measured incident from outside is adjusted by the polarization controller 310a, and the polarization of the sampling light output from the MOD 420 is adjusted by the polarization controller 310b. The frequency of the signal light to be measured is set to $f_0$, and the frequency of the sampling light is set to $f_{SAM}$.

The optical sampling gate 320 is a unit (optical fiber switch) that samples the signal light to be measured with the sampling light output from the MOD 420, and outputs the sampled signal light to be measured. As shown in FIG. 2, the optical sampling gate 320 includes a directional coupler 320a, an optical fiber 320b, a polarizer 320c, and a wavelength filter 320d.

The directional coupler 320a is a unit that combines the incident signal light to be measured and the sampling light, and outputs the combined signal light to the optical fiber 320b. The optical fiber 320b is a cable that transmits the signal light output from the directional coupler 320a.

The polarizer 320c is a unit that changes the transmittance by the ON/OFF of the sampling light included in the signal light that transmits through the optical fiber 320b. The polarizer 320c also extracts out the signal light to be measured, so as to have a frequency of $f_{SAM}$, which is equal to the frequency of the sampling light. The polarizer 320c blocks the signal light (including signal light to be measured) at the timing when the sampling light is turned OFF, and transmits the signal light (including signal light to be measured) at the timing when the sampling light is turned ON.

The wavelength filter 320d is a unit (filter) that extracts the signal light to be measured (frequency of $f_{SAM}$) from the signal light output from the polarizer 320c, and blocks the sampling light included in the signal light.

The directional coupler 330 is a unit that, when the signal light to be measured is incident from the optical sampling gate 320, divides the incident signal light to be measured, and respectively outputs the divided signal light to be measured to the PD 340a and the PD 340b.

The PDs 340a and 340b are units that convert an optical signal to an electric signal. The PD 340a converts the signal light to be measured to the electric signal, and outputs the converted electric signal to the oscilloscope 430. The PD 340b converts the signal light to be measured to the electric signal, and outputs the converted electric signal to the phase comparator 350.

The phase comparator 350 is a unit that compares phases between the electric signal (frequency of $f_{SAM}$) output from the PD 340b and the electric signal (frequency of $f_{SAM}$) output from the mixer 400, and outputs the signal that has an amplitude proportional to the phase difference of the respective electric signals to the LPF 360, as an error signal.

The LPF 360 is a unit (filter) that blocks a high-frequency component of the error signal input from the phase comparator 350. The LPF 360 outputs the error signal with the high-frequency component removed to the VCO 370.

The VCO 370 is a unit that operates based on the error signal output from the LPF 360, generates an RF signal whose frequency is approximately 311 megahertz, for example, and outputs the generated RF signal to the BPF 380.

The BPF 380 is a unit that removes the jitter included in the RF signal, by removing the signal component in a predetermined frequency range of the RF signal output from the VCO 370. The BPF 380 outputs the RF signal with jitter removed to the mixer 400. Because the frequency of the RF signal output from the VCO 370 is approximately 311 megahertz, the BPF 380 can remove the jitter appropriately.

The oscillator 390 is a unit that generates a reference signal of approximately 10 kilohertz (frequency of $\Delta f$), for example, and outputs the generated reference signal to the mixer 400 and the oscilloscope 430.

The mixer 400 is a unit that combines the RF signal (RF signal with jitter removed) output from the BPF 380 and the reference signal output from the oscillator 390, and outputs the combined electric signal (frequency of $f_{SAM}$) to the phase comparator 350, the electric multiplexer 405, and the oscilloscope 430.

The electric multiplexer 405 is a unit that multiplexes the electric signal output from the mixer 400 by N times (N is a positive number). The electric multiplexer 405 outputs the electric signal multiplexed by N times to the sampling pulse light source 410.

The sampling pulse light source 410 is a unit that generates sampling light based on the electric signal (electric signal multiplexed by N times) with a frequency of $f_{SAM}$ output from the electric multiplexer 405, and outputs the generated sampling light to the MOD 420. The sampling pulse light source 410 generates the sampling light based on the electric signal with jitter removed and multiplexed by N times, thereby enabling to generate the stable sampling light.

The MOD 420 is a unit that modulates the sampling light output from the sampling pulse light source 410, by the electric signal with a frequency of $f_{SAM}$ output from the mixer 400. The MOD 420 outputs the modulated sampling light to the optical sampling gate 320.

The oscilloscope 430 is a display unit that receives the electric signal (frequency of $f_{SAM}$) of the signal light to be measured output from the PD 340a, the reference signal (frequency of $\Delta f$) output from the oscillator 390, and the electric signal (frequency of $f_{SAM}$) output from the mixer 400, and displays the waveform of the signal light to be measured.

As described above, in the optical waveform measurement system 300 according to the second embodiment, the phase comparator 350 compares phases between the electric signal output from the PD 340b and the electric signal output from the mixer 400, and outputs the signal that has an amplitude proportional to the phase difference of the respective electric signals to the VCO 370 via the LPF 360, as an error signal. In the optical waveform measurement system 300 according to the second embodiment, the BPF 380 removes the jitter in the electric signal output from the VCO 370, the sampling pulse light source 410 generates the sampling light based on the electric signal with jitter removed, and the MOD 420 modulates the sampling light and outputs the modulated sampling light to the optical sampling gate 320. Accordingly, the optical sampling gate 320 can sample the signal light to be measured with the stable sampling light, and the oscilloscope 430 can measure the waveform of the signal light to be measured correctly.

In the optical waveform measurement system 300 according to the second embodiment, the optical fiber switch that includes the optical fiber 320b and the polarizer 320c is used as an optical sampling gate. Accordingly, the switching efficiency can be improved, and even a phase of low-power signal light to be measured can be stably compared, thereby enabling the VCO 370 to stably generate an RF signal. Moreover, the sampling pulse light source 410 can output the sampling light to the optical sampling gate 320 stably.

An optical waveform measurement system according to a third embodiment of the present invention will now be described. The optical waveform measurement system according to the third embodiment, when the waveform of the signal light to be measured, which is a measurement object, is measured by the oscilloscope or the like, optically gates the signal light to be measured by the optical modulator (MOD), without extracting the RF signal directly from the signal light to be measured. Then, the RF signal is generated based on the optically gated signal light to be measured, and the RF signal with jitter removed is input into the sampling pulse light source. The optical sampling gate samples the signal light to be measured, based on the sampling light output from the sampling pulse light source.

In this manner, the optical waveform measurement system according to the third embodiment samples the signal light to be measured by removing the jitter included in the RF signal, thereby enabling to measure the waveform of the signal light to be measured correctly.

Moreover, in the optical waveform measurement system according to the third embodiment, the optical fiber switch that includes the optical fiber and the polarizer is used as an optical sampling gate. Accordingly, the switching efficiency can be improved, and even a phase of low-power signal light to be measured can be stably compared, thereby enabling to stably generate an RF signal.

Figure 3:
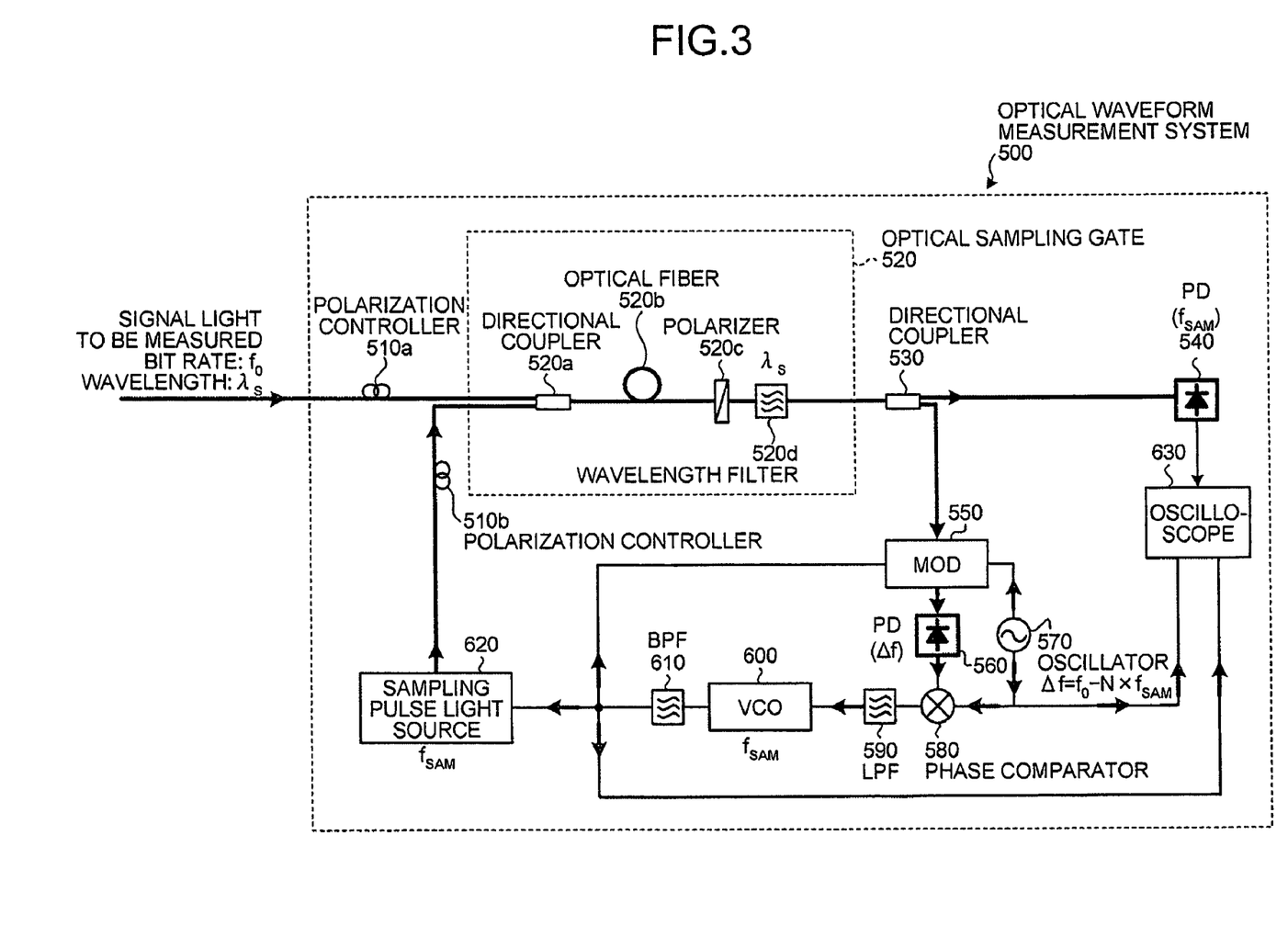
FIG. 3 is a configuration block diagram of an optical waveform measurement system according to a third embodiment of the present invention.

A configuration of the optical waveform measurement system according to the third embodiment will now be explained. FIG. 3 is a configuration block diagram of the optical waveform measurement system according to the third embodiment of the present invention. As shown in FIG. 3, an optical waveform measurement system 500 includes polarization controllers 510a and 510b, an optical sampling gate 520, a directional coupler 530, photo diodes (PDs) 540 and 560, a MOD 550, an oscillator 570, a phase comparator 580, an LPF 590, a VCO 600, a BPF 610, a sampling pulse light source 620, and an oscilloscope 630.

Among these, the polarization controllers 510a and 510b are units that adjust polarization of the signal light to be transmitted. The polarization of the signal light to be measured incident from outside is adjusted by the polarization controller 510a. The polarization of the sampling light output from the sampling pulse light source 620 is adjusted by the polarization controller 510b. The frequency of the signal light to be measured is set to $f_0$, and the frequency of the sampling light is set to $f_{SAM}$.

The optical sampling gate 520 is a unit (optical fiber switch) that samples the signal light to be measured with the sampling light output from the sampling pulse light source 620, and outputs the sampled signal light to be measured.

Unlike an optical gate made of a nonlinear crystal, the efficiency of the optical sampling gate 520 that utilizes nonlinear optical properties of an optical fiber is incomparably high. Therefore, even when a signal with poor OSNR (optical signal-to-noise ratio) is input, the optical sampling gate 520 functions normally. Moreover, even when the low-power signal light is input, the sampled signal light to be measured (frequency of $f_{SAM}$, envelope cycle of $\Delta f$) can be generated, without buried in noise components.

The envelope cycle of $\Delta f$ indicates a cycle of the envelope with respect to the frequency of $f_{SAM}$ of the signal light to be measured output from the optical sampling gate 520. The envelope cycle of $\Delta f$ is equal to the frequency of the RF signal output from the oscillator 570 and can be expressed as the following:

$$\Delta f = f_0 - N \times f_{SAM} \text{ (N is a positive number)}.$$

The optical sampling gate 520, for example, can operate without adjustment, with respect to the signal light to be measured in C band (wavelength between 1530 and 1565 nanometers).

As shown in FIG. 3, the optical sampling gate 520 includes a directional coupler 520a, an optical fiber 520b, a polarizer 520c, and a wavelength filter 520d. The directional coupler 520a is a unit that combines the incident signal light to be measured and the sampling light, and outputs the combined signal light to the optical fiber 520b. The optical fiber 520b is a cable that transmits the signal light output from the directional coupler 520a.

The polarizer 520c is a unit that changes the transmittance by the ON/OFF of the sampling light included in the signal light that transmits through the optical fiber 520b. The polarizer 520c also extracts out the signal light to be measured, so as to have a frequency of $f_{SAM}$, which is equal to the frequency of the sampling light. The polarizer 520c blocks the signal light (including signal light to be measured) at the timing when the sampling light is turned OFF, and transmits the signal light (including signal light to be measured) at the timing when the sampling light is turned ON.

The wavelength filter 520d is a unit (filter) that extracts the signal light to be measured (frequency of $f_{SAM}$) from the signal light output from the polarizer 520c, and blocks the sampling light included in the signal light.

The directional coupler 530 is a unit that, when the signal light to be measured is incident from the optical sampling gate 520, divides the incident signal light to be measured, and outputs the divided signal light to be measured to the PD 540 and the MOD 550, respectively.

The PD 540 is a unit that converts an optical signal to an electric signal. The PD 540 converts the signal light to be measured (frequency of $f_{SAM}$) incident from the directional coupler 530 to the electric signal, and inputs the converted electric signal to the oscilloscope 630.

The MOD 550 is a unit that modulates the signal light to be measured (frequency of $f_{SAM}$) incident from the directional coupler 530, and optically gates the signal light to be measured (frequency of $f_{SAM}$). The MOD 550 time-division multiplexes the signal light to be measured with a frequency of $f_{SAM}$ and a pulse width, by utilizing the electric signal with a frequency of $f_{SAM}$ output from the BPF 610 and the electric signal with a frequency of $\Delta f$ output from the oscillator 570, and generates the signal light to be measured with a frequency of $\Delta f$. For example, the frequency of $f_{SAM}$ is equal to or less than several hundred megahertz, and the frequency of $\Delta f$ is equal to or less than several kilohertz. Therefore, the MOD 550 can execute the time-division multiplexing relatively easy. The MOD 550 emits the modulated signal light to be measured to the PD 560.

An apparatus that corresponds to the MOD 550 may be a $LiNbO_3$ Mach-Zehnder intensity modulator or an EAM (electro-absorption modulator). When the signal light to be measured is thinned out by a multiple-separation of the MOD 550, compared with the signal light not being thinned out, the OSNR of the signal light received at the PD 560 connected to an output terminal of the MOD 550 can be improved up to twice.

The PD 560, as well as the PD 540, is a unit that converts an optical signal into an electric signal. The PD 560 converts the signal light to be measured (signal light to be measured that is time-divided and multiplexed; frequency of $\Delta f$) incident from the MOD 550 to the electric signal, and outputs the converted electric signal to the phase comparator 580.

The oscillator 570 is a unit that generates the electric signal with a frequency of $\Delta f$, and outputs the generated electric signal to the MOD 550, the phase comparator 580, and the oscilloscope 630.

The phase comparator 580 is a unit that compares phases between the electric signal (frequency of $\Delta f$) output from the PD 560 and the electric signal (frequency of $\Delta f$) output from the oscillator 570, and outputs the signal that has an amplitude proportional to the phase difference of the respective electric signals to the LPF 590, as an error signal.

The LPF 590 is a unit (filter) that blocks a high-frequency component of the error signal input from the phase comparator 580. The LPF 590 outputs the error signal with the high-frequency component removed to the VCO 600.

The VCO 600 is a unit that operates based on the error signal output from the LPF 590, for example, generates the RF signal (trigger signal) with a frequency of approximately 311 megahertz (frequency of $f_{SAM}$), and outputs the generated RF signal to the BPF 610.

The BPF 610 is a unit that removes the jitter included in the RF signal, by removing the signal component in a predetermined frequency range of the RF signal output from the VCO 600. The BPF 610 outputs the RF signal with the jitter removed. Because the frequency of the RF signal output from the VCO 600 is approximately 311 megahertz, for example, BPF 610 can remove the jitter appropriately. The RF signal output from the BPF 610 is input into the MOD 550, the sampling pulse light source 620, and the oscilloscope 630.

When the signal to be measured has a large jitter component, there is a possibility that the jitter is added to the RF signal with a frequency of $f_{SAM}$ output from the VCO 600. However, by connecting the BPF 610 with the center frequency of $f_{SAM}$ to an output end of the VCO 600, the jitter component outside the BPF band can be removed, thereby generating stable sampling pulse light.

The sampling pulse light source 620 is a unit that generates the sampling light with a frequency of $f_{SAM}$ based on the electric signal with a frequency of $f_{SAM}$ output from the BPF 610, and outputs the generated sampling light to the optical sampling gate 520 via the polarization controller 510b. The sampling pulse light source 620 generates the sampling light based on the electric signal with jitter removed, thereby generating stable sampling light.

The oscilloscope 630 is a display unit that receives the electric signal (frequency of $f_{SAM}$) of the signal light to be measured output from the PD 540, the electric signal (frequency of $\Delta f$) output from the oscillator 570, and the RF signal (frequency of $f_{SAM}$) output from the BPF 610. The oscilloscope 630 also displays the waveform of the signal light to be measured.

The oscilloscope 630 displays the waveform by sampling the electric signal output from the PD 540, using the RF signal output from the BPF 610 as a trigger signal. The oscilloscope 630 also determines a repetition frequency from the electric signal output from the oscillator 570, and displays an eye pattern of the signal light to be measured, based on the determined repetition frequency.

As described above, in the optical waveform measurement system 500 according to the third embodiment, the MOD 550 optically gates the signal light to be measured, without extracting the RF signal directly from the signal to be measured. The phase comparator 580, the VCO 600, and the like generate the RF signal from the phase difference between the electric signal output from the oscillator and the signal light to be measured converted into the electric signal, based on the optically gated signal light to be measured. The BPF 610 removes the jitter from the RF signal, and outputs the RF signal with jitter removed to the sampling pulse light source 620. The optical sampling gate samples the signal light to be measured, based on the sampling light output from the sampling pulse light source. As a result, the sampling of the signal light to be measured can be stably performed, and the waveform of the signal light to be measured can be measured correctly.

In the optical waveform measurement system 500 according to the third embodiment, the optical fiber switch that includes the optical fiber 520*b* and the polarizer 520*c* is used as the optical sampling gate 520. Accordingly, the switching efficiency can be improved, and even a phase of low-power signal light to be measured can be stably compared, thereby enabling to stably generate an RF signal.

According to the embodiments of the present invention, the waveform of the signal light to be measured can be measured correctly.

According to the embodiments of the present invention, the switching efficiency can be improved and the phase can be compared stably.

According to the embodiments of the present invention, because the sampling light is generated from the electric signal, stable sampling light can be generated.

While embodiments of the present invention have been described, the present invention is not limited to the above-described embodiments, and various modifications can be made within the spirit and scope of the appended claims.

Among the respective processes explained in the present embodiments, all or a part of the process explained as being performed automatically may be performed manually. Or, all or a part of the process explained as being performed manually may be performed automatically using a known method.

The information including the process procedure, the controlling procedure, specific names, and various data and parameters shown in the specification or in the drawings may be changed in any way, unless otherwise specified.

The respective constituent elements of the respective apparatuses shown in the drawings are functional concepts, and the same physical configuration as in the drawings is not necessarily required. In other words, the specific mode of dispersion and integration of the respective apparatuses is not limited to the ones shown in the drawings, but all or a part thereof may be functionally or physically dispersed or integrated in any unit, depending on various loads and usage states.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical waveform measurement system that measures a waveform of signal light, comprising:

a signal light generating unit that changes, when the signal light and sampling light are incident on the signal light generating unit, transmittance depending on the sampling light and generates output signal light prepared by matching a frequency of the signal light and a frequency of the sampling light;

a jitter removing unit that converts the output signal light into an electric signal having a frequency less than a predetermined frequency and removes a jitter included in the electric signal;

a sampling light adjusting unit that adjusts the sampling light incident on the signal light generating unit, based on the electric signal with the jitter removed by the jitter removing unit; and an optical waveform measuring unit that measures the waveform of the signal light, based on the output signal light generated from the sampling light adjusted by the sampling light adjusting unit and being incident on the signal light generating unit.

2. The optical waveform measurement system according to claim 1, wherein the signal light generating unit includes an optical fiber that transmits the signal light, and a polarizer whose transmittance changes depending on the sampling light.

3. The optical waveform measurement system according to claim 1, wherein the jitter removing unit includes a comparing unit that converts the output signal light generated by the signal light generating unit into the electric signal, and compares a phase of the converted electric signal and a phase of a signal output from an oscillator, and an electric signal output unit that generates an electric signal having an amplitude corresponding to a phase difference based on a comparison result of the comparing unit, and after removing the jitter from the generated electric signal, outputs the electric signal to the sampling light adjusting unit.

4. The optical waveform measurement system according to claim 1, wherein the jitter removing unit includes a comparing unit that optically gates the output signal light generated by the signal light generating unit, converts the output signal light to the electric signal and compares the frequency phase of the converted electric signal and a phase of a signal output from an oscillator, and an electric signal output unit that generates an electric signal having an amplitude corresponding to a phase difference based on a comparison result of the comparing unit, and after removing the jitter from the generated electric signal, outputs the electric signal to the sampling light adjusting unit.

5. An optical waveform measurement method for measuring a waveform of signal light, comprising:

generating output signal light by changing transmittance depending on sampling light input to an optical gate, so that a frequency of the signal light input to an optical gate and a frequency of the sampling light are matched;

converting the output signal light into an electric signal having a frequency less than a predetermined frequency;

removing a jitter included in the electric signal;

adjusting the sampling light based on the electric signal with the jitter removed; and measuring the waveform of the signal light, based on the output signal light generated from the adjusted sampling light input to the optical gate fate.

6. The optical waveform measurement method according to claim 5, wherein the optical gate includes an optical fiber that transmits the signal light, and a polarizer whose transmittance changes depending on the sampling light.

7. The optical waveform measurement method according to claim 5, wherein the removing the jitter includes converting the generated output signal light into the electric signal, comparing a phase of the converted electric signal and a phase of a signal output from an oscillator, generating an electric signal having an amplitude corresponding to a phase difference based on a comparison result of the comparing, and after removing the jitter from the generated electric signal, outputting the electric signal.

8. The optical waveform measurement method according to claim 5, wherein the removing the jitter includes converting into the electric signal the output signal light generated after input to the optical gate, comparing the frequency phase of the converted electric signal and a phase of a signal output from an oscillator, generating an electric signal having an amplitude corresponding to a phase difference based on a comparison result of the comparing, and after removing the jitter from the generated electric signal, outputting the electric signal.

* * * * *

UNITED STATES PATENT AND TRADEMARK OFFICE
CERTIFICATE OF CORRECTION

| | | |
|---|---|---|
| PATENT NO. | : 7,877,017 B2 | Page 1 of 1 |
| APPLICATION NO. | : 12/071514 | |
| DATED | : January 25, 2011 | |
| INVENTOR(S) | : Fumio Futami et al. | |

It is certified that error appears in the above-identified patent and that said Letters Patent is hereby corrected as shown below:

Column 14, Line 40 in Claim 4, before "phase" delete "frequency".

Column 14, Line 61 in Claim 5, after "gate" delete "fate".

Column 16, Line 3 in Claim 8, before "phase" delete "frequency".

Signed and Sealed this
Fifth Day of April, 2011

David J. Kappos
*Director of the United States Patent and Trademark Office*